United States Patent [19]

Bien et al.

[11] 4,370,794
[45] Feb. 1, 1983

[54] CLINCH NUT AND METHOD OF INSTALLING SAME

[75] Inventors: Alfred A. Bien, West Bloomfield; Frederick W. Heidt, Fenton, both of Mich.

[73] Assignee: Multifastener Corporation, Detroit, Mich.

[21] Appl. No.: 193,327

[22] Filed: Oct. 1, 1980

Related U.S. Application Data

[63] Continuation-in-part of Ser. No. 931,696, Aug. 7, 1978, abandoned.

[51] Int. Cl.³ .................... B21D 39/00; B23P 11/00
[52] U.S. Cl. .................................. 29/509; 29/520; 29/407; 411/180
[58] Field of Search .................. 29/509, 432, 432.1, 29/432.2, 520, 407; 411/180

[56] References Cited

U.S. PATENT DOCUMENTS

| | | | |
|---|---|---|---|
| 2,486,769 | 11/1949 | Watson, Jr. | 411/180 |
| 2,722,259 | 11/1955 | Eckenbeck et al. | 411/180 |
| 2,749,606 | 6/1956 | Donahue | 29/432 |
| 2,987,811 | 6/1961 | Acres | 29/520 X |
| 3,000,420 | 9/1961 | Spokes | 29/520 UX |
| 3,133,579 | 5/1964 | Grimm et al. | 411/180 |
| 3,186,284 | 6/1965 | Bennett | 29/432 UX |
| 3,242,962 | 3/1966 | Dupree | 411/180 |
| 3,311,148 | 3/1967 | Leitner | 411/180 |
| 3,443,617 | 5/1969 | Whiteside et al. | 411/180 |

*Primary Examiner*—Charlie T. Moon
*Attorney, Agent, or Firm*—Cullen, Sloman, Cantor, Grauer, Scott & Rutherford

[57] ABSTRACT

A clinch nut having a projecting rectangular pilot and opposed laterally extending flanges. The side edges of the pilot are inclined inwardly from the pilot end face and the flanges have opposed projecting abutment portions extending laterally from the inclined pilot faces to an edge spaced from the side faces of the flanges. The method includes punching a rectangular opening in a panel to receive the nut pilot and ramming the nut abutment portions against the panel to deform the panel beneath the inclined pilot side faces. The nut and nut ram-die are configured to fully seat the nut and fill the spaces beneath the pilot side faces.

2 Claims, 7 Drawing Figures

CLINCH NUT AND METHOD OF INSTALLING SAME

BACKGROUND OF INVENTION

This application is a continuation-in-part of application Ser. No. 931,696 filed Aug. 7, 1978 now abandoned.

The present invention relates to clinch nuts which are installed by a die in a continuous operation and the method of installing clinch nuts with little or no deformation of the nut.

Clinch nuts of the type disclosed herein generally required deformation of the pilot or nut body. The nut may be rectangular and is generally hat-shaped including a rectangular pilot and laterally extending flanges. The pilot is received through a rectangular panel opening and clinched by deforming the pilot, generally at the nut corners, with a configured die. The panel may be pierced with the nut pilot or prepierced, prior to installation. Examples of this type of nut are shown in the prior U.S. Pats. of Newcomb, Nos. 2,750,660 and 2,799,188.

More recent improvements in self-piercing fasteners include an undercut in the side faces of the projecting pilot and the pierce nut is installed in one stroke of a press without deformation of the nut. The pilot pierces its own opening in the panel and the panel is deformed beneath the shoulders defined by the undercut to permanently install the nut in the pierced panel opening. Examples of self-piercing fasteners are shown in U.S. Pat. Nos. 2,707,322 and 3,152,628.

The self-clinching and pierce nuts described above are used extensively in the automotive field to retain a body panel or structural member to the panel having the nut installed. These types of nut installations are however limited by the panel thickness, because the pilot must project through the panel opening. Weld nuts are used in heavy metal or thick panel automotive applications. Weld nuts are, however, expensive to install. It is therefore an object of the present invention to provide a self-clinching nut which may be used in heavy metal applications, but which does not require substantial deformation of the nut.

SUMMARY OF INVENTION

The self-clinching nut of the present invention is particularly suitable for securement in a prepierced panel opening, including panels in structural members having a thickness greater than the pilot height. The preferred nut is generally rectangular having a projecting central pilot and opposed laterally extending flanges. The pilot includes a generally flat upper face and inwardly inclined side faces extending from said upper face to abutment faces on said flanges. The pilot also includes a threaded bore generally perpendicular to the upper face. The abutment faces of the flanges extend from the inclined side faces of the pilot to an edge spaced from the side faces of the flanges.

During installation, the pilot is received in a prepierced rectangular panel opening configured to closely receive the pilot. The abutment faces are then rammed against the opposed faces of the panel to deform the panel beneath the inclined side faces of the pilot. In the preferred embodiment, the side faces of the pilot smoothly blend into the upper pilot face and the abutment flange faces in cylindrical surfaces to promote the flow of the panel. Further, the volume of the abutment flange portions which project above the top faces of the flanges is preferably greater than the spaces defined beneath the inclined pilot side faces, but less than four times the volume of such spaces to insure complete filling of the spaces beneath the pilot, and seating of the flanges against the panel faces.

The method of this invention thus includes punching a rectangular opening in the panel, inserting the projecting rectangular pilot of the nut in the panel opening and finally ramming the abutment faces against the adjacent panel to deform the panel beneath the inclined side faces of the pilot as described above. In the preferred method of this invention, the panel opening is formed by punching the opening from the opposite side, forming a projecting retention punch-breakout ridge adjacent the panel opening. The nut pilot is then inserted through the retention ridge, which is deformed by the abutment portions beneath the inclined pilot side faces. The nut may be installed by a die-ram having a rectangular annular projection which engages the bottom face of the nut, opposite the pilot. The annular projecting die will deform the bottom face of the nut when the ram pressure exeeds the required installation pressure for the clinch nut of the present invention.

Because the nut is installed from one side of the panel and the clinch does not require deformation of the nut pilot, the self-clinching nut of the present invention may be installed in a panel having a thickness greater than the pilot height, measured from the flanges to the upper face of the pilot. Further, the flanges may be relatively thick, providing greater pull out strength than present clinch nut applications. Further, the nut and panel assembly is stronger than applications requiring deformation of the nut. The clinch nut and method of the present invention therefore provided many advantages over the prior art. The clinch nut is relatively easy to install, requiring only one stroke of the press and no pilot die is required. Other advantages and meritorious features of the present invention will be more fully understood from the following description of the preferrd embodiments, the appended claims and the drawings, a brief description of which follows.

DESCRIPTION OF THE PREFERRED EMBODIMENTS

Figure 1:
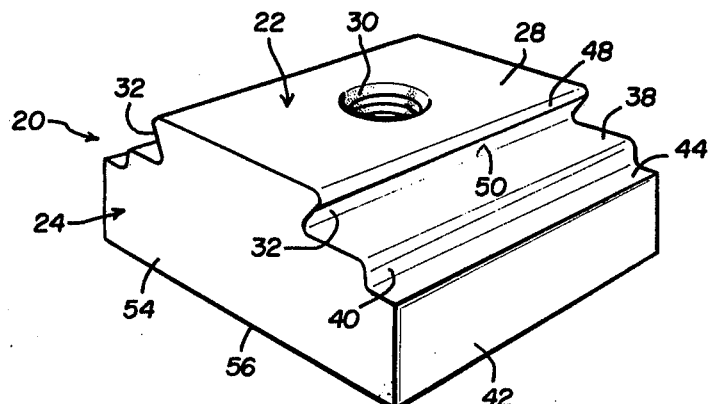
FIG. 1 is a top perspective view of one embodiment of the self-clinching nut of the present invention.

The self-clinching nut 20 shown in FIG. 1 includes a projecting rectangular pilot portion 22 and laterally projecting flanges 24. It will be understood that the self-clinching nut of the present invention is preferably formed of a tough material such as steel for securement of a panel or structural member to the structural element to which the nut is secured. The nut must have sufficient strength, particularly in automotive applications, to withstand shock and vibration.

In the dislosed embodiment, the pilot portion includes a flat upper or top face 28, a threaded bore 30 perpendicular to the top face and opposed inwardly inclined side faces 32. The pilot side faces 32 are inclined inwardly from the top face 28 to the flange portion, however the inclined faces may be spced from the top face. The flange portions 24 include an abutment portion 36 having an abutment face 38 generally parallel to the top face 28 of the pilot and spaced above the top face 44 of the flanges. The abutment faces extend laterally from the inclined side faces 32 of the pilot portion to a perpendicular edge 40 spaced from the side faces 42 of the flange portion.

In the preferred embodiment, the inclined side faces 32 of the pilot portion smoothly blend into the abutment faces 38 of the flange portions and the top face 28 of the pilot in cylindrical segment fillets and rounds 50 and 48, respectively. Similarly, the abutment face 38 may blend into the edge 40 by cylindrical segment round 52. It will thus be seen that the self-clinching nut of the present invention may be formed by rolling an extruded metal wire of round or rectangular cross-section. After rolling, the wire has the cross-section of the preferred clinch nut of this invention. The wire is then cut to the desired length forming smooth end faces 54, punched and threaded to form the threaded bore 30. The bottom face 56 is preferably flat for installation as defind hereinbelow.

Figure 2:
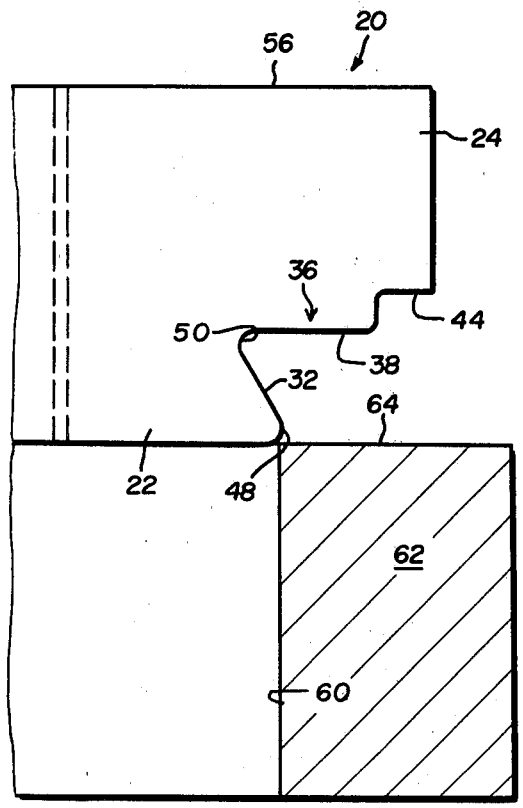
FIGS. 2 and 3 are side cross-sectional views of the self-clinching nut shown in FIG. 1 being installed in a prepierced thick panel section.
Figure 3:
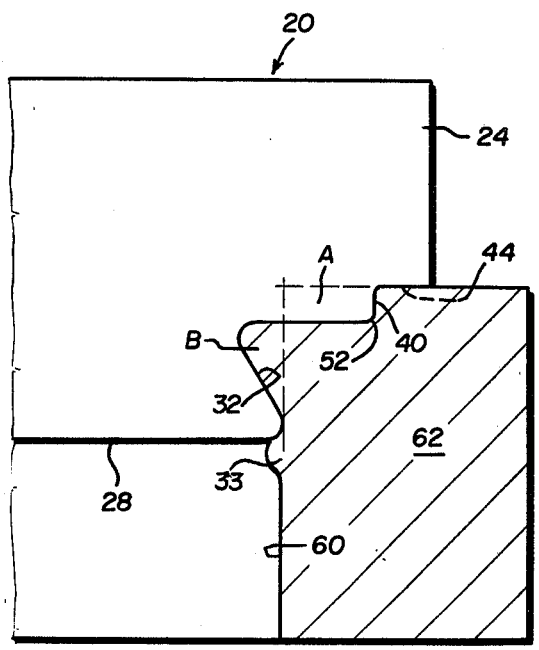

The self-clinching nut of the present invention is installed by first punching or piercing a rectangular opening 60 in a panel 62 as shown in FIG. 2. As shown in FIGS. 2 and 3, the rectangular opening 60 is configured to receive the rectangular pilot 22 of the clinch nut in an interference press-fit. The pilot portion is rammed or press-fitted into the panel by engaging the bottom wall 56 of the nut. When the abutment faces 38 engage the panel face 64 adjacent opening 60, the abutment portion 36 is then rammed into the panel to deform the panel beneath the inclined side walls 32 of the pilot portion as shown in FIG. 3. Opposed rounded projections 33 are thus formed in the walls of the panel opening 60, at the leading edge of the opposed cylindrical segment rounds 48 of the pilot, as the nut pilot is rammed into the panel opening and the metal fills the space beneath the inclined walls 32 thereby assuring securement of nut 20 in panel 62.

It will be understood that the deformed portion of the panel preferably completely fills the area beneath the inclined side walls of the pilot. Thus, the volume "A" of the abutment portions is equal to and preferably greater than the spaces "B" beneath the inclined pilot side faces. It has also been discovered that the volume of the flange abutment portions "A" should not be greater than four times the volume of the space "B" beneath the pilot side walls to assure seating of the top faces 44 of the flanges against the panel as shown in FIG. 3, but prevent fracture of the nut.

Figure 5:
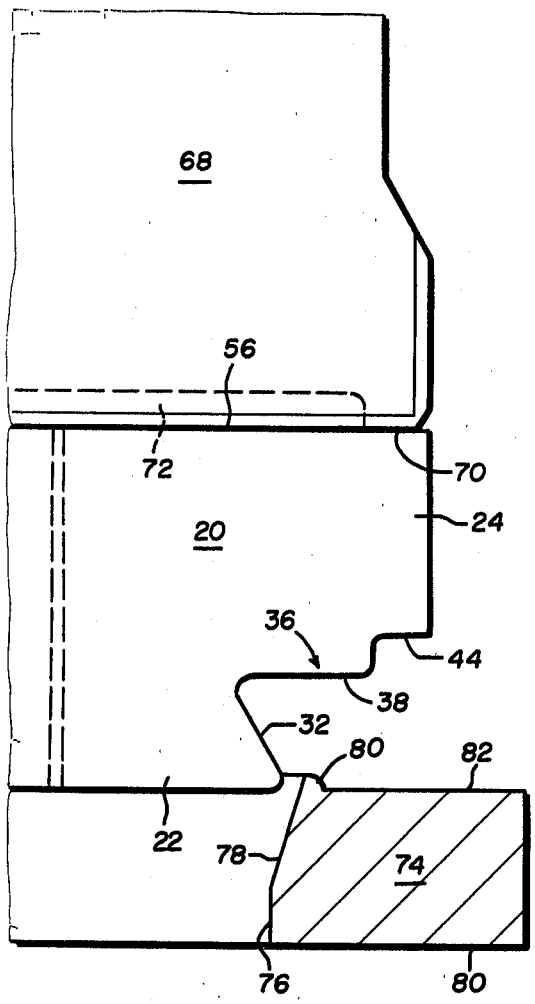
FIGS. 5 and 6 illustrate a method of installing the self-clinching nut of the present invention in a thinner panel section using the ram-die of FIG. 4.
Figure 4:
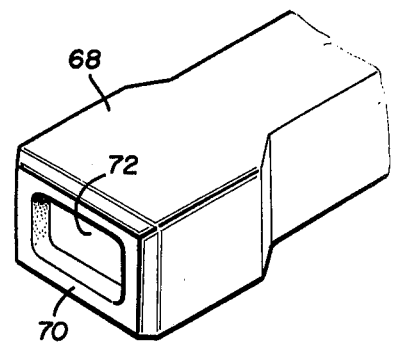
FIG. 4 is a side perspective view of a ram-die which may be used to install the self-clinching nut of the present invention.
Figure 6:
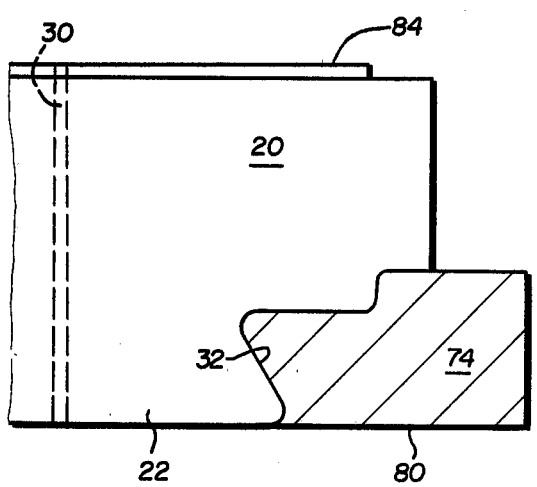
Figure 7:
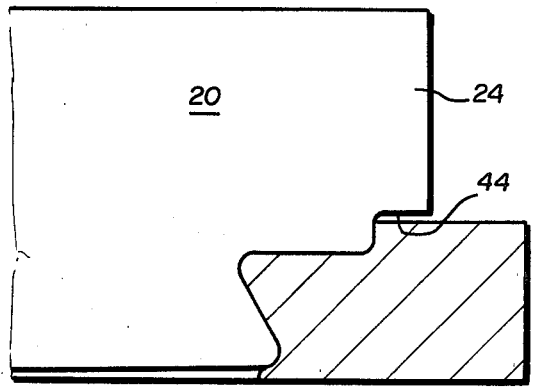
FIG. 7 is a side cross-sectional view of the nut and panel assembly, similar to FIG. 6, wherein the nut is not fully seated in the panel opening.

A special ram-die 68 is used to install the clinch nut of this invention in FIG. 5. The ram-die includes a rectangular-annular die projection 70 as shown in FIG. 4 circumscribing a relieved portion 72. As shown in FIG. 5, the rectangular annular die 70 is substantially the same size as the bottom wall 56 of the clinch nut to be installed and the annular die 70 thus circumscribes the bottom wall of the nut. In FIGS. 5 to 7, the clinch nut 20 is installed in a relatively thin panel 74 having a rectangular opening 76 configured to closely receive the pilot 22 of the nut. The panel in FIG. 5 has been punched by a rectangular punch from the opposite side 80 of the panel. Thus, the opening includes a generally conical breakout 78 and an annular projecting retention ridge 80 which aids in the retention of the nut as described below. It will be understood that the generally conical breakout 78 and the retention ridge 80 may be controlled by controlling the speed of the punch and the material of the panel 74.

The nut 20 is installed by first disposing the pilot into the generally conical breakout portion 78 of the opening 76 in the panel 74 until the abutment face 38 engages the retention ridge 80. The nut is then rammed by the ram-die 68, deforming the retention ridge 80 and the panel face 82 beneath the inclined spaces 32 of the pilot. The retention ridge thus provide additional panel material beneath the inclined faces 32 of the pilot, improving the pull-out strength of the nut and panel assembly.

FIGS. 6 and 7 illustrate nut and panel assemblies resulting from different pressure settings of the punch 68. It will be understood that the ram-die 68 may be installed in a conventional hydraulic press permitting setting of a predetermined maximum pressure. Thus, the installation pressure may be set on the press. Where the pressure is too low, as shown in FIG. 7, the nut does not fully seat in the opening. This condition may be easily detected in the clinch nut of the present invention by examining the side edges of the nut and panel assembly. Where the top face 44 of the flange 24 is not fully seated on the panel, the maximum pressure setting should be increased. In most installations, however, it is not possible to set the preferred pressure exactly. Where the pressure is too great, the nut may fracture. Thus, underhitting is common. This problem is solved in the preferred method of the present invention by the rectangular annular die projection 70. In this method, the maximum pressure is purposely set at greater than the minimum pressure required to fully seat the nut. The annular die surface 70 then coins the outer edge of the nut as shown at 84 in FIG. 6.

The method of installing the clinch nut thus includes initially examining the nut and panel assembly to determine whether or not the nut has been fully seated and coined as shown at 84 in FIG. 6. Where the flange face 44 is not fully seated, the pressure is increased until coining is observed. The operator can then be certain that the nut is fully seated in the panel opening.

It will be understood by those skilled in the art that various modifications may be made to the self-clinching nut and method of this invention without departing from the purview of the appended claims. For example, a conventional press ram may be used to install the clinch nut and the dimensions of the clinch nut may be modified as set forth above.

We claim:

1. A method of installing a nut in a panel, comprising the steps of:
   punching a rectangular opening in said panel,
   inserting and press-fitting the projecting rectangular pilot of a metal nut in said panel opening, said panel having a thickness greater than the pilot height, said pilot having a generally flat end face and side faces inclined inwardly from said end face and said nut having opposed laterally extending flanges extending from said pilot portion, said flanges having abutment faces spaced from the top faces of said flanges and extending laterally from said inclined side faces to a perpendicular edge spaced from the side faces of said flanges, said inclined pilot side faces smoothly blending into said pilot end face in generally opposed cylindrical segment rounds and into said flange abutment faces in opposed generally cylindrical segment rounds and fillets which promote panel flow beneath said inclined side faces and the volume defined by the projection of said abutment faces above said flanges being less than four times greater than the volume of the spaces beneath said inclined pilot faces, said opposed cylindrical segment round surfaces of the pilot end face forming opposed rounded projections in the walls of the panel opening at the leading edge of the pilot, and ramming said opposed abutment faces of said nut flanges against the opposed panel face adjacent said opening in a single continuous stroke, deforming and displacing the panel beneath said inclined pilot side faces and continuing to force said abutment faces into said panel to seat said top faces against said panel and fill the spaces beneath the inclined side pilot faces, permanently retaining said nut in said panel opening.

2. A method of installing a nut in a panel, comprising:

punching a rectangular opening in said panel, forming a projecting retention punch-breakout ridge adjacent the panel opening, inserting the projecting rectangular pilot of a metal nut through said retention ridge, said pilot having a generally flat end face, said nut having opposed laterally extending flanges spaced from said pilot end face, the side faces of said pilot above said flanges being inclined inwardly from said pilot end face and said flanges having abutment faces spaced above the top faces of said flanges and extending laterally from said pilot inclined side faces to a perpendicular edge spaced from the side faces of said flanges, the end faces of said nut being generally smooth perpendicular to said pilot side faces, installing said nut by a die-ram having a rectangular annular projection engaging the bottom face of said nut opposite said pilot, said rectangular annular projection circumscribing the bottom face of said nut, ramming said opposed abutment faces of said nut flanges against the opposed panel face adjacent said opening in a stroke continuous with the insertion of said pilot, deforming said ridge beneath said pilot inclined faces upon engagement by said flange abutment faces, deforming and displacing the panel beneath said inclined pilot side faces and continuing to force said abutment faces into said panel to seat said top flange faces against said panel, said annular die projection deforming said bottom nut face due to the ram pressure exceeding the required nut installation pressure to thereby permanently retain said nut in said panel opening.

* * * * *